United States Patent [19]

Romberg

[11] Patent Number: 4,635,687
[45] Date of Patent: Jan. 13, 1987

[54] FENCE TOOL FOR WIRE CRIMPING AND WIRE CUTTING

[76] Inventor: Felix B. Romberg, P.O. Box 218, Holland, Tex. 76534

[21] Appl. No.: 707,951

[22] Filed: Mar. 4, 1985

[51] Int. Cl.⁴ .............................................. B21F 1/04
[52] U.S. Cl. ..................................... 140/106; 30/184; 140/123
[58] Field of Search ................. 140/106, 105, 87, 123; 72/385, 409; D8/52, 14, 98, 32, 60; 81/352, 353, 354, 355, 373; 7/117, 125, 132, 158, 133, 134; 30/182, 184

[56] References Cited

U.S. PATENT DOCUMENTS

| | | | |
|---|---|---|---|
| 242,142 | 5/1881 | Levalley | 30/184 |
| 365,455 | 6/1887 | Windisch | 30/184 |
| 551,041 | 12/1895 | Mueller | 30/184 |
| 838,008 | 12/1906 | Chandler et al. | 7/134 |
| 926,559 | 6/1909 | Hall | 30/184 |
| 3,050,841 | 8/1962 | Esselstyn | D8/52 |
| 3,166,960 | 1/1965 | Roessler | 81/355 |
| 3,688,553 | 9/1972 | Demler, Sr. | 81/355 |
| 3,831,642 | 8/1974 | Greeott | 140/106 |

Primary Examiner—Lowell A. Larson
Attorney, Agent, or Firm—Richards, Harris, Medlock & Andrews

[57] ABSTRACT

An improved hand tool for cutting and crimping fence wire is provided. The tool includes a toggle actuated mechanism for crimping wire between two rows of linearly translatable teeth and for cutting wire between a pair of cutting elements.

7 Claims, 12 Drawing Figures

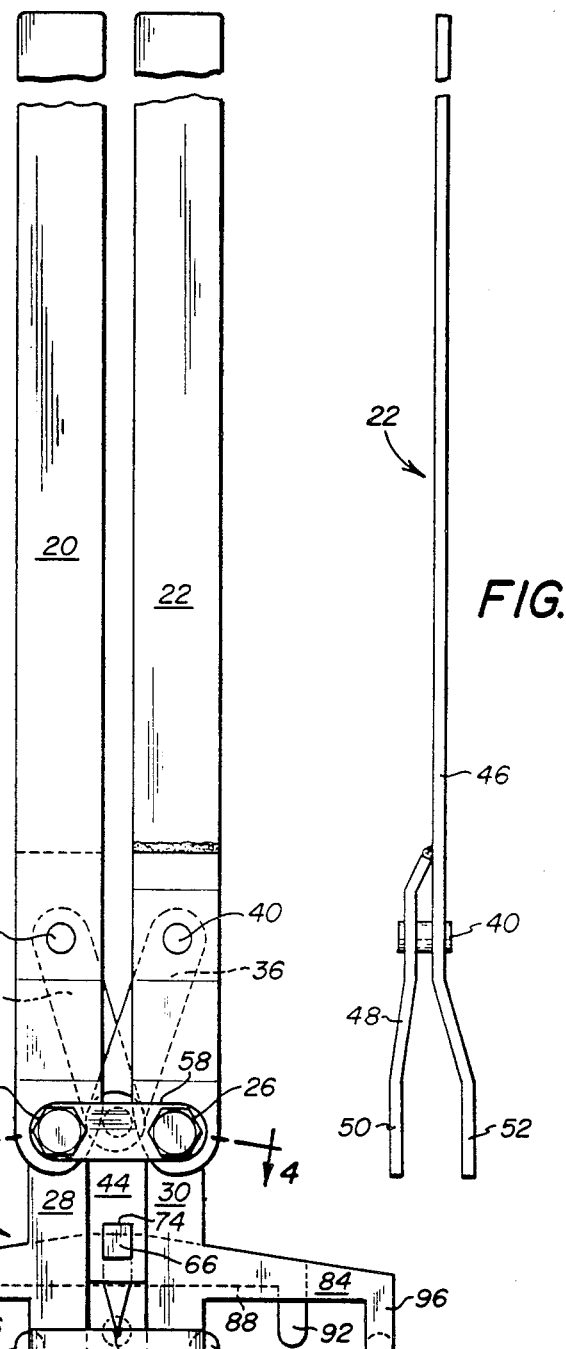

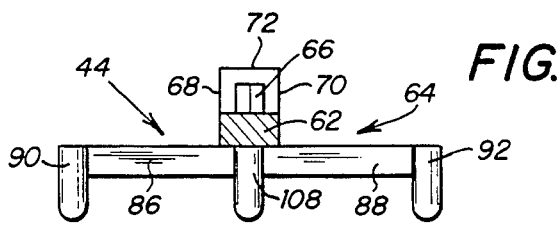
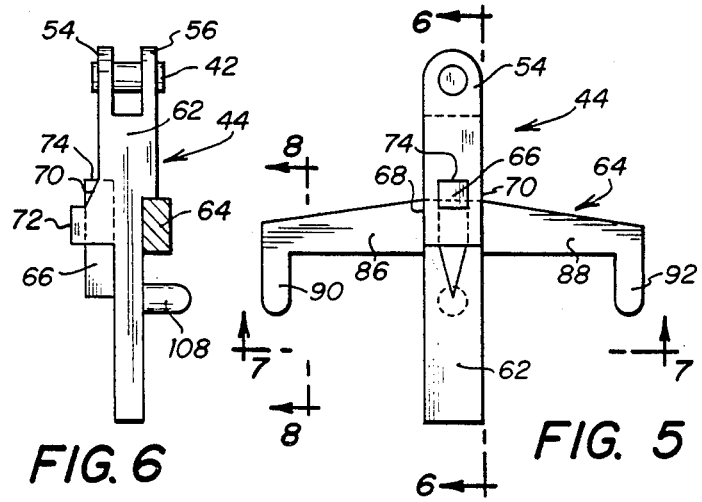
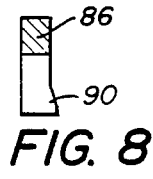
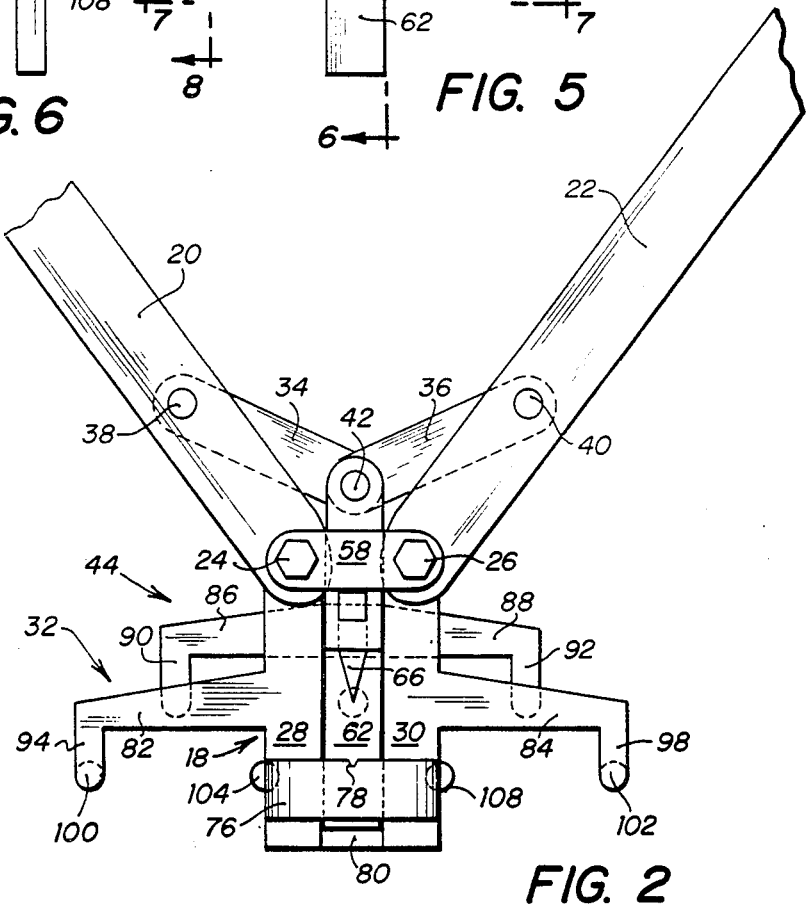

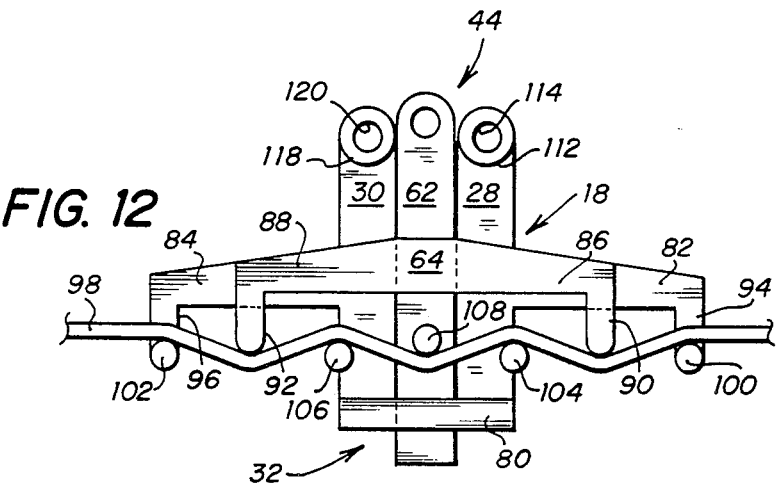
FIG. 12
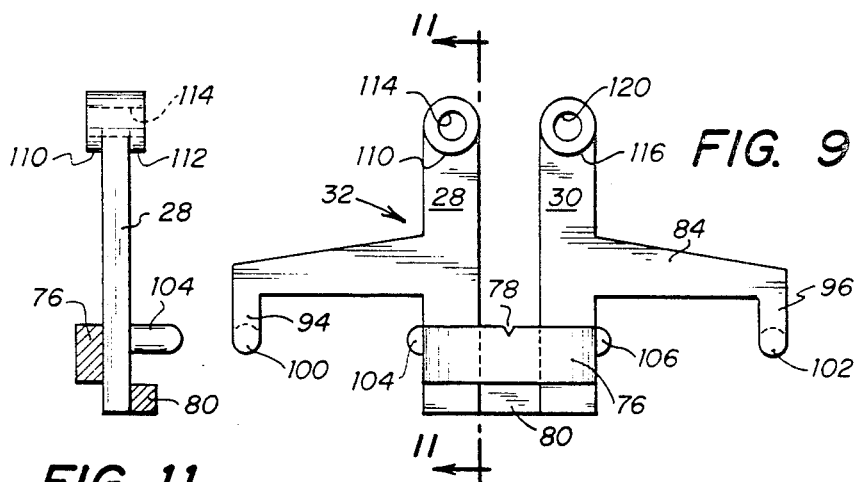
FIG. 11
FIG. 9
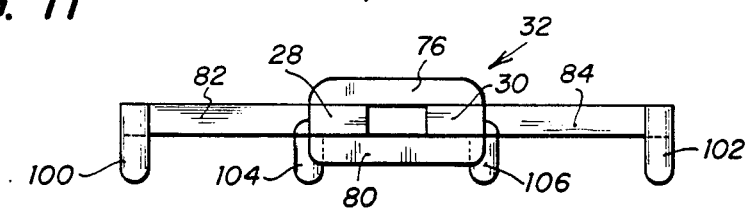
FIG. 10

FENCE TOOL FOR WIRE CRIMPING AND WIRE CUTTING

TECHNICAL FIELD

The present invention relates to hand tools for repairing fences, and more particularly relates to a hand tool for wire crimping and wire cutting.

BACKGROUND ART

A number of tools have heretofore been developed for tightening fence wire, particularly barbed wire, while it remains in place on fence posts. However, as fence maintenance tools must often be carried considerable distances by a walking fence worker, the work of carrying such tools along has generally outweighed their usefulness, especially if they be bulky or have limited application.

Wire crimping tools are known to be expedient for tightening short lengths and short sections of fastened fence wire. It is also known that a series of alternate kinks of small amplitude can leave a fence wire tighter than a single deeper one. U.S. Pat. No. 3,831,642 issued to Grecott is for a wire crimping tool which simultaneously makes a series of small crimps. U.S. Pat. No. 2,087,125 to Smith, et al., describes a similar device. The force required to crimp wire varies approximately as the square of the depth of the crimp while the mechanical advantage of the Grecott and Smith, et al., tools remains constant as the crimp deepens. Grecott and Smith, et al., employ single levers, thereby limiting the mechanical advantage and usefulness of their tools. A tool with increased mechanical advantage would be used not merely to restore slack wire to moderate tension, but to higher tension which requires making a more limited number of kinks simultaneously and avoiding bending wire too far out of the line of tension.

Thus, there presently exists a need for a tool sized to be easily carried in a bucket with other small tools and supplies, yet is both a wire crimper and wire cutter, with superior mechanical advantage.

SUMMARY OF THE INVENTION

The tool has a headpiece and a pair of handle levers hingedly secured thereto. The headpiece embraces a member which is slidable back and forth therein. A pair of toggle links connect the two levers with the slidable member for combined and progressively increasing thrust which the slidable member applies for wire cutting on one side of the headpiece and for wire crimping on the other side of the headpiece.

BRIEF DESCRIPTION OF THE DRAWINGS

A more complete understanding of the invention and its advantages will be apparent from the Detailed Description taken in conjunction with the accompanying Drawings in which:

FIG. 1 is a view of the wire cutting side of the tool with the levers parallel;

FIG. 2 is a view of the wire cutting side of the tool with the levers spread farthest apart;

FIG. 3 is a side view of a handle lever;

FIG. 4 is a sectional view taken along line 4—4 of FIG. 1;

FIG. 5 is a view of the wire cutting side of the slidable unit;

FIGS. 6, 7 and 8 are sectional views taken respectively along lines 6—6, 7—7, 8—8 of FIG. 5;

FIG. 9 is a view of the wire cutting side of the frame of the headpiece;

FIG. 10 is a bottom view of the frame of the headpiece;

FIG. 11 is a sectional view taken along line 11—11 of FIG. 9; and

FIG. 12 is a view showing the wire crimping side of the frame, the thereto assembled slidable unit, and a wire being crimped.

DETAILED DESCRIPTION

Referring initially to FIGS. 1-4, the present invention is a hand tool with a headpiece 18 and a pair of handle levers 20 and 22. The levers are hingedly secured by bolts 24 and 26 to the ends of spaced apart members 28 and 30 of a frame 32. A pair of identical toggle links 34 and 36 are pivotally secured at ends by pins 38 and 40 to the levers 20 and 22, respectively. At their other ends these toggle links 34 and 36 are pivotally secured by one pivot pin 42 to the end of a slidable unit 44 for converting swinging movements of the handle levers towards and away from each other into longitudinal operating movements of said slidable unit. As best seen in FIG. 3, the lever 22 is comprised of a long flat bar 46 and a shorter fork 48, which parts are bent and welded together and perforated at 50 and 52 to receive the pivot bolt 26 above and below the frame member 30 as shown in FIG. 4. Also, at the pivot pin 40 these forks are spaced apart to receive the thickness of the toggle link, shown in FIG. 4, between them on one side of center relative to the forked ends of the lever. The levers 20 and 22 are structurally identical but are oppositely hinged relative to each other so that, by virtue of the off center location of toggle links 34 and 36, the two toggle links operate on different planes as seen in FIGS. 1 and 4.

Referring now to FIGS. 5-8, the slidable unit 44 has spaced perforated forks 54 and 56 between which the toggle links 34 and 36 are pivoted one above the other by the pivot pin 42. As seen in FIG. 4, the forks 54 and 56 are confined vertically by overlapping portions of the two levers 20 and 22. The forks of these levers are, in turn, confined by identical cross links 58 and 60 (FIGS. 2 and 4), which cross links connect bolts 24 and 26. The frame members 28 and 30 are spaced apart to permit longitudinal movement of a central member 62 and forks 54 and 56 of the slidable unit therebetween, and the pivoted ends of the two levers 20 and 22 are spaced far enough apart to clear the ends of the pivot pin 42. The slidable unit 44 is comprised of the elongated central member 62 of uniform width, an integral wire crimping cross member 64 on one side of the central member, and a wire cutting insert 66 on the opposite side relative to the cross member. The wire cutting insert 66 is of tool steel and is of square section at the retained end and tapers to a cutting edge beyond the retained end. Retaining this insert is a pocket defined by parallel walls 68 and 70, shown best in FIG. 7, and an integral cross tie 72 connecting the parallel walls over the insert. The square end of the insert abuts a shoulder 74, as shown in FIGS. 5 and 7.

Referring now to FIGS. 9-11, the frame 32 includes a cross bar 76 integral with the spaced longitudinal frame members 28 and 30. Cross bar 76 is on the same side of the headpiece 18 as the wire cutting insert 66 and serves as an anvil therefor. When the levers 20 and 22 are in their spread position shown in FIG. 2, the cutting insert 66 is spaced from the cross bar 76 so a wire can be placed therebetween. Then by moving the levers to their parallel position shown in FIG. 1, the gap between the cutting insert 66 and the cross bar 76 is closed severing the wire. To avoid direct contact of the cutting edge with the cross bar 76, the cross bar 76 is notched at notch 78 to accommodate the cutting edge. Integral cross bar 80 connects the frame members 28 and 30 on the opposite side relative to the cross bar 76 and just beyond the cross bar 76, enclosing the longitudinal member 62 of the slidable unit for longitudinal movement therebetween. Arms 82 and 84 are integral with and project laterally from the spaced frame members 28 and 30, respectively. As shown in FIGS. 5 and 7, the slidable unit also has a pair of laterally extending arms 86 and 88. As shown in FIGS. 2 and 12, arms 86 and 88 are slidable on an adjacent plane relative to frame members 28 and 30 and arms 82 and 84. Each of the four arms 82, 84, 86 and 88 extends to an elbow and then parallel to the elongated central slidable member 62 in the direction of that member's slidable movement when the handle levers are moved from their spread position to their parallel position. The parallel end portions of the arms 86 and 88 are wire crimping teeth 90 and 92 and are expanded and rounded at their ends as shown in FIGS. 7 and 8. The parallel portions 94 and 96 of the arms 82 and 84 are on the same plane as the spaced frame members 28 and 30 and confine a wire 98 to be crimped as shown in FIG. 12. The parallel portions 94 and 96 of the frame arms 82 and 84 include cylindrical projections 100 and 102 to support the wire 98 against wire crimping pressure. Two additional wire crimping projections 104 and 106 are secured to the outer sides of frame members 28 and 30, making a total of four equally spaced wire crimping teeth 100, 102, 104 and 106 in a straight row on the frame 32. Opposed to these four wire crimping teeth and alternating with them in making a wire crimp are a row of three teeth on the slidable unit 44. Midway between wire crimping teeth 90 and 92 is the third tooth of this row, a cylindrical projection 108 on the central member 62 of the slidable unit as best shown in FIGS. 6, 7 and 12. The two rows of wire crimping teeth are parallel and in the same plane. As shown in FIGS. 10 and 11, the end of frame member 30 which receives the hinge bolt 24 has integral collars 110 and 112 adding thickness on opposite sides to provide a wide hinge connection for lever 22 and has a perforation 114 for the hinge bolt 24. Similarly, the frame member 28 has integral collars 116 and 118 and the perforation 120.

In operation, fence wire is strung parallel with the ground. To crimp fence wire in place, the tool with handles spread apart is placed broadside down against the wire. The tool receives the wire which is visible from above in the space between the two rows of wire crimping teeth.

Barbed fence wire is manufactured with barbs spaced at intervals of four, five or six inches. With this tool taking a 4½ inch wire crimping bite, only one barb need come within the bite. It is desirable that this barb come between wire crimping teeth. The tool can readily be placed on the wire so the one barb comes between two of the teeth. After properly placing the tool on the wire, the handle levers 20 and 22 are moved to their parallel position which crimps the wire as shown in FIG. 12. The wire crimping teeth are offset from the lateral arms and cross bar 80 to provide clearance for the wire and its barbs.

The hand gripped ends of levers 20 and 22 may be covered with plastic sleeves. As these levers are moved from their extreme spread position to their parallel position their mechanical advantage becomes approximately threefold. This is desirable since there is no resistance until a wire on the cutting side of the tool, or on the wire crimping side, becomes pinched. Then the resistance of the wire increases progressively with additional lever movement. It is also to be noted that in fence pliers and similarly pivoted hand tools, the levers oppose each other so that the achieved mechanical advantage is that of a single lever, whereas the mechanical advantage of the present tool is the sum of the mechanical advantage of the separate levers.

I claim:

1. A wire cutting tool comprising;
    a frame having a spaced apart pair of longitudinal frame members;
    an elongated central member positioned between said frame members for longitudinally sliding operating movements relative thereto;
    a wire cutting pair of members of which a first member is secured to each of said frame members and extends between said frame members over the central member;
    the second member of said pair of wire cutting members being affixed to said central member;
    a pair of operating levers, each pivotally secured at one end to separate ones of said frame members for swinging movements toward and away from each other;
    a pair of toggle links pivotally connecting each of said levers with said central member, whereby movement of said levers to a widely spread position separates the pair of wire cutting members so that a wire may be received between them, and subsequent movement of said levers towards each other closes the space between the pair of wire cutting members to cut the wire in two;
    wherein said frame members and said central member are substantially coplanar, each of said two longitudinal frame members and said central frame member being wide in a common plane; and
    further having a structural member integrally connecting said frame members under said central member and confining said central member slidably between said frame members, adjacent said first wire cutting member beyond said second wire cutting member from where said toggle links are attached to said central member.

2. A hand tool comprising:
    a pair of laterally spaced apart frame members interconnected to form a frame having first and second laterally extending planar sides;
    a unit slidable relative to said frame;
    said slidable unit including an elongated member secured between said pair of frame members for longitudinal linear slidable operating movements relative thereto;
    wire cutting means on said first side of said frame and comprising a pair of co-acting cutting elements, one said cutting element affixed to said elongated member intermediate of its ends and the other said cutting element affixed to said frame;
    wire crimping means on said second side of said frame and comprising at least two co-acting rows of wire crimping teeth, one row affixed to said slidable unit intermediate of its longitudinal ends and one row affixed to said frame, such that linear relative motion between said rows is enabled;

a pair of handle levers pivotally secured to said frame for swinging movements towards and away from each other;

a pair of toggle links pivotally connecting said levers with said elongated member to convert swinging movements of said levers to longitudinal operating movements of said slidable unit relative to said frame; and said toggle links being sized and interconnected with said levers and slidable unit such that said wire cutting means and said wire crimping means are activated in linear motion by swinging said levers towards each other, and said wire cutting means and said wire crimping means are placed in a wire receiving relationship by swinging said levers away from each other.

3. The hand tool according to claim 2 in which:

each of said frame members is perforated at one end;

each of said handle levers has a perforated forked end enclosing the said perforated end of one of said frame members;

said forked ends being enclosed by a pair of cross links connecting two hinge bolts that connect said levers with said frame members; and said elongated member being disposed between said frame members and forked ends of said levers.

4. A wire crimping tool comprising:

a headpiece including a frame and a slidable unit;

said frame including a pair of laterally spaced apart longitudinal frame members;

said slidable unit including an elongated central member positioned between said spaced apart frame members for longitudinally linear sliding operating movements;

said longitudinal frame members and said elongated central member being generally parallel and being wide each in a first plane;

a pair of central arms integral with said central member and extending laterally beyond said frame members intermediate of its ends in an adjacent plane;

a first set of three wire crimping teeth affixed to said slidable unit and extending in said adjacent plane, said first set including a centrally located tooth and a tooth located at each end of said central arms;

a second set of two wire crimping teeth projecting from said pair of spaced apart frame members into the plane of said first set of three wire crimping teeth;

a structural member interconnecting said spaced apart frame members under said elongated central member beyond said two wire crimping teeth from said central arms;

a pair of handle levers pivotally secured to said pair of spaced apart frame members for swinging movements towards and away from each other;

a pair of toggle links pivotally connecting said levers with said slidable central member of said slidable unit, whereby said slidable unit and said first set of teeth are linearly translated relative said frame by swinging levers towards and away from each other; and a second set of teeth on said frame members being located relative to said first set of teeth to permit entrance of a straight wire between the two sets of teeth when said levers are farthest apart and levers are moved towards each other.

5. The wire crimping tool according to claim 4 further comprising a pair of frame arms extending laterally from said spaced apart longitudinal frame members in said first plane, each said frame arm supporting a wire crimping tooth situated in line with said second set of two wire crimping teeth to form a row of four wire crimping teeth, the outer teeth of said row of four teeth being located farther from said central member than the outer teeth in the first set of three teeth.

6. The wire crimping tool according to claim 5 in which said pair of frame arms each has an outer portion extending in the direction in which the central member moves when said levers are moved towards each other, and said outer portions have at their ends the outer wire crimping teeth of said row of four wire crimping teeth extending into said adjacent plane.

7. The wire crimping tool according to claim 4 in which the wire crimping teeth of said pair of central arms extend from said central arms in the direction in which said central member moves when said levers are moved toward each other.

* * * * *